UNITED STATES PATENT OFFICE 2,608,483

FOOD SUPPLEMENT FOR ANIMALS AND POULTRY

Ralph W. Hayes, Morrisville, Vt.

No Drawing. Application December 23, 1949,
Serial No. 134,841

9 Claims. (Cl. 99—2)

The present invention relates to a food supplement for animals and poultry and to the method of making same.

An object of the invention is to provide a food supplement for animals and poultry, which will provide the necessary ingredients usually lacking in the ordinary feed of animals and poultry so as to insure healthy animals and poultry, more uniform growth and greater output, and which will present these ingredients in a form for good assimilation and a high rate of utilization.

A further object is to provide such a food supplement which is in a form and of a consistency such that it can be fed to animals and poultry as such or in a mixture with ordinary feed and which will be palatable to animals and poultry so as to present no difficulty in feeding.

A further object is to provide such a food supplement which is in a desirable, concentrated and stable form for shipment and storage without danger of deterioration and spoilage.

Another object is to provide such a food supplement which is prepared from what are commonly waste products of the fish and dairy industries and to place these materials in condition for assimilation as an animal and poultry food supplement.

Other objects will be in part obvious and in part pointed out more in detail in the following description of the invention.

The product of the present invention in its preferred form is in the nature of a putty-like mass which can be easily stored and transported, and which can be fed successfully to animals and poultry either as such or in a mixture with other feed. The basic materials which are utilized in forming the preferred embodiment of the food supplement of this invention are fish solubles, brewer's yeast, whey, and buttermilk or skim milk.

In the practice of the invention a quantity of raw whey, which is the serum of milk separated from the casein or coagulable part, is preferably allowed to ferment to a slight degree prior to use. This can be accomplished by permitting the raw whey to stand approximately twenty-four hours, for example, at room temperature. Moderate heat may be applied, if desired, to hasten fermentation. Fermentation will generally take place without any additions as a results of the lactic acid naturally present in the whey, and fermentation will increase the acidity of the whey, a factor which I have found to be desirable in preparing the food supplement of my invention.

This whey, preferably fermented, is then mixed with a small quantity of buttermilk or skim milk. The buttermilk or skim milk, which ever is used, may be used conveniently in its natural state or it may be in a concentrated form if preferred, such as a condensed buttermilk or a dried skim milk. The amount of buttermilk or skim milk, whichever is added, is generally in the range of five to twenty-five per cent and preferably in the range of ten to twenty per cent by weight. The resulting mixture is then condensed down or evaporated to a semi-solid state. This may be accomplished in any of the conventional evaporators available for this purpose and is preferably carried out under vacuum to insure a sufficiently low temperature (preferably not exceeding approximately 120 degrees F.) so as to avoid destroying the enzymes and vitamins present. If desired, the whey or the mixture of whey and buttermilk or skim milk may be preheated to aid in the later condensing.

After the whey and the other milk by-product mentioned are condensed down to a proper consistency (which may be characterized as syrup-like), it is drawn from the vacuum pans into a vat or tank where it is blended with the fish solubles and also with the brewer's yeast if it is desired to include this latter ingredient. The fish solubles are in the form of a syrupy liquid which is a readily available commercial by-product of the fish industry and is believed to be a concentrated or condensed distillate of fish residue. I have observed in accordance with the invention that such fish solubles are a natural source of the animal protein factor B-12 and have devised the present method of placing this material in a palatable and assimilable form in combination with the dairy products herein mentioned. The brewers yeast which is used in the preferred embodiment of my invention is preferably in a dried concentrated form. About ten to fifty per cent of the fish solubles and about one to five per cent of dried brewer's yeast preferably are added. If desired a small quantity of a mold inhibitor or preservative, such as benzoate of soda, may also be added at this stage. In general the amount of preservative added should not exceed $\frac{1}{10}$ of 1%. The blending of these materials should be done at about room temperature or cooler. For this reason it may be preferable to accomplish the blending in a mixer, provided with cooling apparatus. To assist in blending, the fish solubles and dried brewer's yeast may be preliminarily blended before being added to the condensed mixture of fermented whey and other milk product.

After the blending has been completed, the product is then drawn into suitable containers and allowed to set up to form the putty-like product hereinbefore described.

By the practice of the method of the present invention it is possible to utilize the referred to products of the fish and dairy industries, which are normally waste products and yet are the only natural sources of any consequence of the animal protein factor B-12 and to prepare a uniform blended product of semi-solid consistency which contains the materials mentioned in a form in which it can be handled and utilized without difficulty and in which there will be no separating out of the various constituents of the blend.

The blended product so formed is readily assimilable and can be fed to animals and poultry as such or in a mixture with other feed and it will be consumed eagerly in large quantity by the animals and poultry without any feeding difficulty. The result of adding the food supplement is generally evidenced by healthier animals and poultry, a greater resistance to disease and an accelerated and uniform rate of growth.

The product can be made economically at low cost, and all the materials utilized are readily available commercially in large quantities.

It will be understood that the foregoing description of the invention is given merely by way of illustration and as exemplary and that any modification or variations of the invention which would be suggested to one skilled in the art are intended to be included within the scope of the invention.

I claim as my invention:

1. A method of forming a food supplement for animals and poultry comprising forming a mixture of fermented whey with about 5 to 25% of a milk derivative of the group consisting of buttermilk, skim milk and concentrates thereof, condensing the mixture under vacuum at moderate temperature to a semi-solid state, and blending with the condensed mixture about 10 to 50% of fish solubles and about 1 to 5% dried brewer's yeast to form a putty-like mass.

2. A method of forming a food supplement for animals and poultry comprising forming a mixture of fermented whey with about 5 to 25% of a milk derivative of the group consisting of buttermilk and skim milk, condensing the mixture to a semi-solid state, forming a blend of about 10 to 50% fish solubles and about 1 to 5% brewer's yeast, and then blending the last-named blend with the first-named mixture at a temperature not exceeding room temperature to form a putty-like mass.

3. A method of forming a food supplement for animals and poultry comprising forming a mixture of fermented whey with about 5 to 25% of a milk derivative of the group consisting of buttermilk and skim milk, condensing the mixture under vacuum and at a moderate temperature to a semi-solid state, and then blending therewith at a temperature not exceeding room temperature a blend of about 10 to 50% fish solubles and about 1 to 5% brewer's yeast.

4. A method of forming a food supplement for animals and poultry comprising forming a mixture of fermented whey with about 10 to 20% of a milk derivative of the group consisting of buttermilk and skim milk, condensing the mixture to a semi-solid state, adding to the mixture about 10 to 50% of fish solubles and about 1 to 5% brewer's yeast, and mixing and cooling the final mixture to form a putty-like blend.

5. A method of forming a food supplement for animals and poultry comprising fermenting a quantity of raw whey, admixing therewith from 5 to 25% of a milk derivative of the group consisting of buttermilk and skim milk, condensing the mixture under vacuum and at moderate temperature, forming a blend of 10 to 50% fish solubles and 1 to 5% brewer's yeast, blending the last named blend with the condensed mixture at a temperature not exceeding room temperature, and then permitting the resulting blend to set up as a putty-like mass.

6. A method of forming a food supplement for animals and poultry comprising condensing a mixture of fermented whey and 5 to 25% of buttermilk to a semi-solid state, and blending therewith a mixture of 10 to 50% fish solubles and 1 to 5% brewer's yeast to form a putty-like mass, said blending being carried out by stirring at room temperature or below.

7. A method of forming a food supplement for animals and poultry comprising condensing a mixture of fermented whey and 5 to 25% of skim milk to a semi-solid state, and blending therewith a mixture of 10 to 50% fish solubles and 1 to 5% brewer's yeast to form a putty-like mass, said blending being carried out by stirring at room temperature or below.

8. A semi-solid food supplement containing essential vitamins and proteins for animals and poultry consisting essentially of a mixture of about 10 to 50% fish solubles, 5 to 25% of a milk derivative of the group consisting of buttermilk, skim milk and concentrates thereof and the balance fermented whey, said mixture having a putty-like consistency resulting from blending the ingredients at room temperature or less.

9. A semi-solid food supplement containing essential vitamins and proteins for animals and poultry consisting essentially of a mixture of about 10 to 50% fish solubles, 1 to 5% brewer's yeast, 10 to 20% of a milk derivative of the group consisting of buttermilk, skim milk and concentrates thereof and the balance condensed whey, said mixture having a putty-like consistency resulting from blending the ingredients at room temperature or less.

RALPH W. HAYES.

REFERENCES CITED

The following references are of record in the file of this patent:

UNITED STATES PATENTS

| Number | Name | Date |
|---|---|---|
| 1,521,784 | Mitchell | Jan. 6, 1925 |
| 2,056,107 | Lee | Sept. 29, 1936 |
| 2,235,613 | Grelck | Mar. 18, 1941 |
| 2,254,241 | Pittman et al. | Sept. 2, 1941 |
| 2,371,812 | Ernst | Mar. 20, 1945 |
| 2,454,315 | Gunther | Nov. 23, 1945 |